United States Patent
Ohmacht et al.

(10) Patent No.: US 8,990,819 B2
(45) Date of Patent: *Mar. 24, 2015

(54) EFFICIENT ROLLBACK AND RETRY OF CONFLICTED SPECULATIVE THREADS USING DISTRIBUTED TOKENS

(71) Applicant: International Business Machines Corporation, Armonk, NY (US)

(72) Inventors: Martin Ohmacht, Yorktown Heights, NY (US); Raul E. Silvera, Woodbridge (CA); Mark G. Stoodley, Markham (CA); Kai-Ting A. Wang, North York (CA)

(73) Assignee: International Business Machines Corporation, Armonk, NY (US)

( * ) Notice: Subject to any disclaimer, the term of this patent is extended or adjusted under 35 U.S.C. 154(b) by 210 days.

This patent is subject to a terminal disclaimer.

(21) Appl. No.: 13/730,427

(22) Filed: Dec. 28, 2012

(65) Prior Publication Data

US 2014/0096141 A1 Apr. 3, 2014

Related U.S. Application Data

(63) Continuation-in-part of application No. 13/632,022, filed on Sep. 30, 2012.

(51) Int. Cl.
*G06F 9/48* (2006.01)
*G06F 9/44* (2006.01)

(52) U.S. Cl.
CPC .................................. *G06F 9/4881* (2013.01)
USPC ......... 718/100; 718/102; 712/220; 712/E9.05

(58) Field of Classification Search
None
See application file for complete search history.

(56) References Cited

U.S. PATENT DOCUMENTS

| 7,340,569 | B2 | 3/2008 | Goodman et al. |
| 8,001,329 | B2 | 8/2011 | von Praun |
| 8,438,571 | B2 * | 5/2013 | Gooding et al. ............... 718/102 |
| 2009/0177871 | A1 | 7/2009 | Von Praun et al. |

(Continued)

OTHER PUBLICATIONS

Rundberg, Peter, et al., "An All-Software Thread-Level Data Dependence Speculation System for Multiprocessors," Journal of Instruction-Level Parallelism, 2001.

(Continued)

*Primary Examiner* — Qing Wu
(74) *Attorney, Agent, or Firm* — Nelson and Nelson; Daniel P. Nelson; Alexis V. Nelson

(57) ABSTRACT

A method for rolling back speculative threads in symmetric-multiprocessing (SMP) environments is disclosed. In one embodiment, such a method includes detecting an aborted thread at runtime and determining whether the aborted thread is an oldest aborted thread. In the event the aborted thread is the oldest aborted thread, the method sets a high-priority request for allocation to an absolute thread number associated with the oldest aborted thread. The method further detects that the high-priority request is set and, in response, modifies a local allocation token of the oldest aborted thread. The modification prompts the oldest aborted thread to retry a work unit associated with its absolute thread number. The oldest aborted thread subsequently initiates the retry of a successor thread by updating the successor thread's local allocation token. A corresponding apparatus and computer program product are also disclosed.

13 Claims, 7 Drawing Sheets

(56) References Cited

U.S. PATENT DOCUMENTS

| | | |
|---|---|---|
| 2009/0287725 A1 | 11/2009 | von Praun |
| 2011/0029490 A1 | 2/2011 | Agarwal et al. |
| 2011/0209154 A1 | 8/2011 | Gooding et al. |
| 2011/0209155 A1 | 8/2011 | Giampapa et al. |
| 2011/0225375 A1 | 9/2011 | Rajwar et al. |

OTHER PUBLICATIONS

Rajwar, Ravi, et al., "Speculative Lock Elision: Enabling Highly Concurrent Multithreaded Execution," Proceedings of the 34th International Symposium on Microarchitecture (MICRO), Dec. 2001.

Raman, Arun, et al., "Speculative Parallelization Using Software Multi-Threaded Transactions," Proceedings of the Fifteenth Edition of ASPLOS on Architectural Support for Programming Languages and Operating Systems, pp. 65-76, Mar. 2010.

Oancea, Cosmin, et al., "Distributed Models of Thread-Level Speculation," Proceedings of the International Conference on Parallel and Distributed Processing Techniques and Applications, 2005.

Prabhu, Prakash, et al., "Safe Programmable Speculative Parallelism," Proceedings of the 2010 ACM SIGPLAN Conference on Programming Language Design and Implementation, pp. 50-61, 2010.

* cited by examiner

US 8,990,819 B2

EFFICIENT ROLLBACK AND RETRY OF CONFLICTED SPECULATIVE THREADS USING DISTRIBUTED TOKENS

BACKGROUND

1. Field of the Invention

This invention relates to apparatus and methods for efficiently rolling back and retrying conflicted speculative threads in SMP environments using distributed tokens.

2. Background of the Invention

Speculative execution (SE), also known as thread-level speculation (TLS), requires in-order start, as well as in-order commit of threads. The workload is typically split into a sequence of work units, referred to as absolute thread numbers (ATNs), that are assigned to a group of n threads, in sequence. A complete round of allocation assigns work units to threads $T_0, T_1, \ldots, T_{n-2}, T_{n-1}$. By dispatching the threads in order, and committing them in order, program semantics are preserved.

The manner in which current SMP systems perform speculative execution is inefficient and difficult to debug. For example, current SMP systems require the kernel to track the number of conflict events (i.e., events causing threads to abort). When the number of conflict events reaches a threshold, the kernel modifies a global variable, referred to herein as an "allocation token," to initiate retries of the aborted threads. Threads operating in user space also need to update the allocation token. As a result, a lock is required to protect the allocation token. Implementing a lock that is shared between the kernel and the SMP runtime makes the design both inefficient as well as difficult to debug. For example, a sequence of code used to start speculation is shown below. A similar locking sequence is also present in the decision code.

```
while {
    lock allocation_token;
    if (allocation_token == thread's ATN)
        proceed to obtain specID;
    else
        unlock allocation_token;
        continue;
}
```

In view of the foregoing, what are needed are apparatus and methods to more efficiently roll back and retry conflicted speculative threads in SMP environments. Ideally, such apparatus and methods will remove the locking requirement associated with the allocation token.

SUMMARY

The invention has been developed in response to the present state of the art and, in particular, in response to the problems and needs in the art that have not yet been fully solved by currently available apparatus and methods. Accordingly, apparatus and methods have been developed to more efficiently roll back speculative threads in symmetric-multiprocessing (SMP) environments. The features and advantages of the invention will become more fully apparent from the following description and appended claims, or may be learned by practice of the invention as set forth hereinafter.

Consistent with the foregoing, a method for rolling back speculative threads in symmetric-multiprocessing (SMP) environments is disclosed herein. In one embodiment, such a method includes detecting an aborted thread at runtime and determining whether the aborted thread is an oldest aborted thread. In the event the aborted thread is the oldest aborted thread, the method sets a high-priority request for allocation to an absolute thread number associated with the oldest aborted thread. The method further detects that the high-priority request is set and, in response, modifies a local allocation token of the oldest aborted thread. The modification prompts the oldest aborted thread to retry a work unit associated with its absolute thread number.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
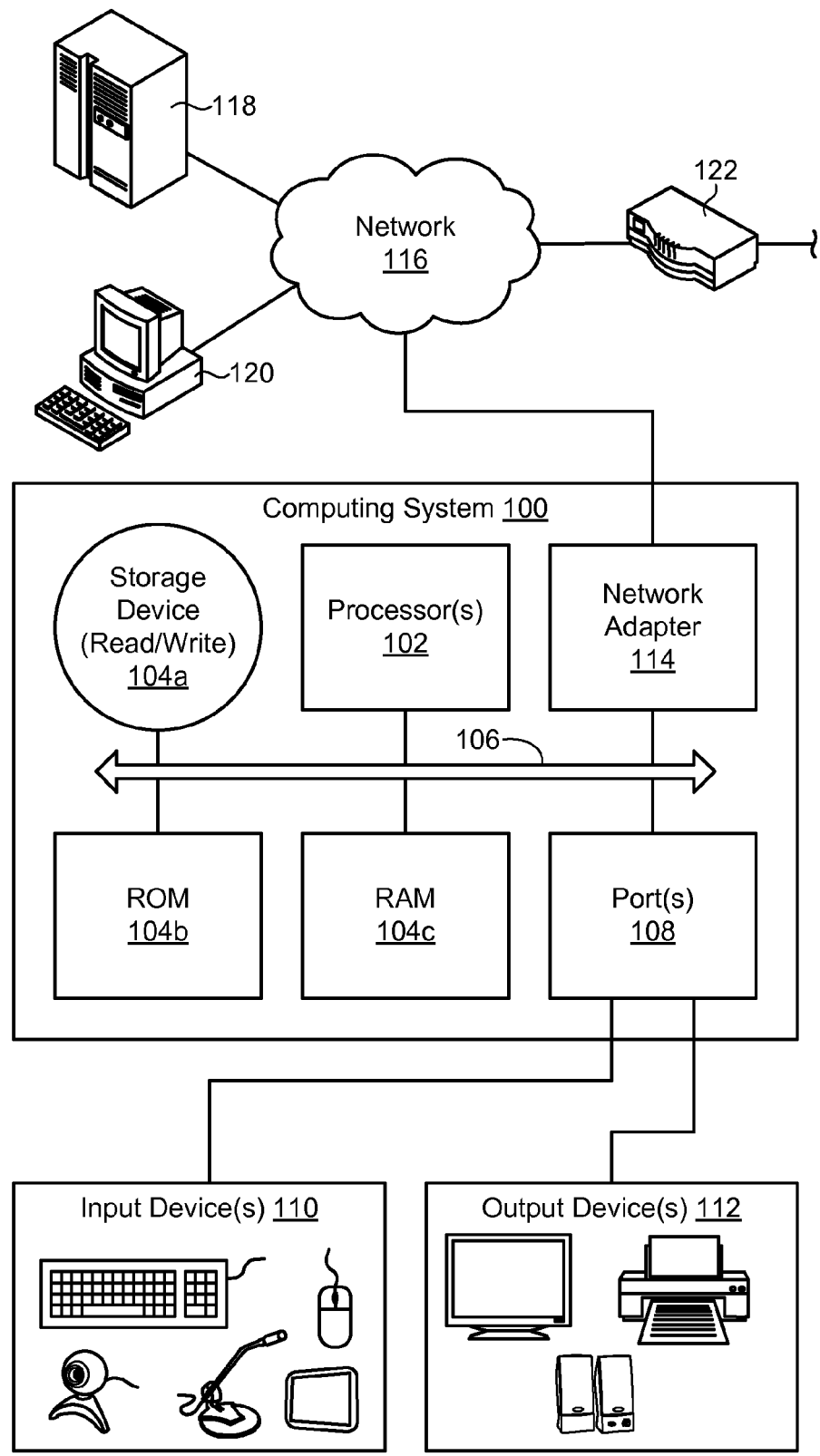
FIG. 1 is a high-level block diagram showing one example of a computing system in which an apparatus and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, conventional procedural programming languages such as the "C" programming language, scripting languages such as JavaScript, or similar programming languages. Computer program code for implementing the invention may also be written in a low-level programming language such as assembly language.

Embodiments of the invention may be described below with reference to flowchart illustrations and/or block diagrams of methods, apparatus, systems, and computer program products. It will be understood that each block of the flowchart illustrations and/or block diagrams, and combinations of blocks in the flowchart illustrations and/or block diagrams, may be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a computing system 100 is illustrated. The computing system 100 is presented to show one example of an environment where an apparatus and method in accordance with the invention may be implemented. The computing system 100 is presented only by way of example and is not intended to be limiting. Indeed, the apparatus and methods disclosed herein may be applicable to a wide variety of different computing systems in addition to the computing system 100 shown. The apparatus and methods disclosed herein may also potentially be distributed across multiple computing systems 100.

As shown, the computing system 100 includes at least one processor 102 and may include more than one processor 102. The processor 102 may be operably connected to a memory 104. The memory 104 may include one or more non-volatile storage devices such as hard drives 104a, solid state drives 104a, CD-ROM drives 104a, DVD-ROM drives 104a, tape drives 104a, or the like. The memory 104 may also include non-volatile memory such as a read-only memory 104b (e.g., ROM, EPROM, EEPROM, and/or Flash ROM) or volatile memory such as a random access memory 104c (RAM or operational memory). A bus 106, or plurality of buses 106, may interconnect the processor 102, memory devices 104, and other devices to enable data and/or instructions to pass therebetween.

To enable communication with external systems or devices, the computing system 100 may include one or more ports 108. Such ports 108 may be embodied as wired ports 108 (e.g., USB ports, serial ports, Firewire ports, SCSI ports, parallel ports, etc.) or wireless ports 108 (e.g., Bluetooth, IrDA, etc.). The ports 108 may enable communication with one or more input devices 110 (e.g., keyboards, mice, touch-screens, cameras, microphones, scanners, storage devices, etc.) and output devices 112 (e.g., displays, monitors, speakers, printers, storage devices, etc.). The ports 108 may also enable communication with other computing systems 100.

In certain embodiments, the computing system 100 includes a network adapter 114 to connect the computing system 100 to a network 116, such as a LAN, WAN, or the Internet. Such a network 116 may enable the computing system 100 to connect to one or more servers 118, workstations 120, personal computers 120, mobile computing devices, or other devices. The network 116 may also enable the computing system 100 to connect to another network by way of a router 122 or other device 122. Such a router 122 may allow the computing system 100 to communicate with servers, workstations, personal computers, or other devices located on different networks.

Figure 2:
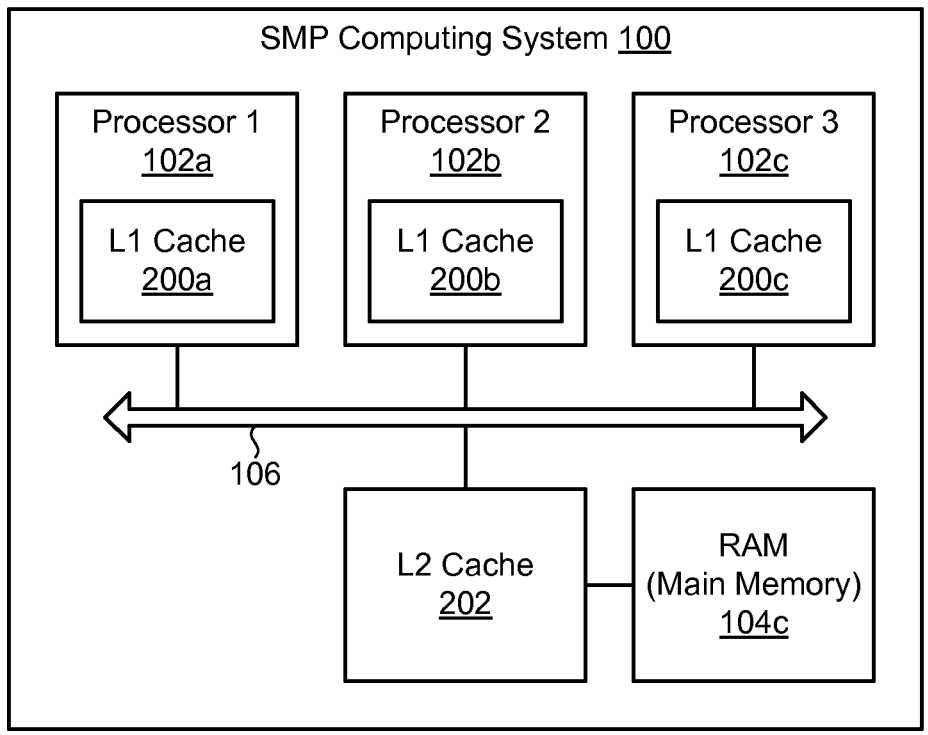
FIG. 2 is a high-level block diagram showing one example of a computing system (i.e., hardware platform) configured to perform symmetric multiprocessing (SMP)

Referring to FIG. 2, one example of a computing system 100 configured for symmetric multiprocessing (SMP) is illustrated. As shown, the SMP computing system 100 (also called a symmetric multiprocessor 100 or symmetric multiprocessor system 100) includes multiple processors 102a-c connected to a single shared memory 104c and controlled by a single operating system (OS) instance. The processors 102a-c may be interconnected using buses 106, crossbar switches, on-chip mesh networks, or the like. The SMP computing system 100 may allow any processor 102a-c to work on any task no matter where data for that task is located in memory 104c, provided that each task in the system 100 is not executed by multiple processors 102a-c at the same time. With proper operating system support, the SMP computing system 100 may move tasks between processors 102a-c to balance the workload. In certain embodiments, each processor 102 in the SMP computing system 100 may have its own local level-one (L1) cache 200a-c to speed up data access and reduce traffic on the system bus 106. The processors 102a-c may also share a level-two (L2) cache 202.

Figure 3:
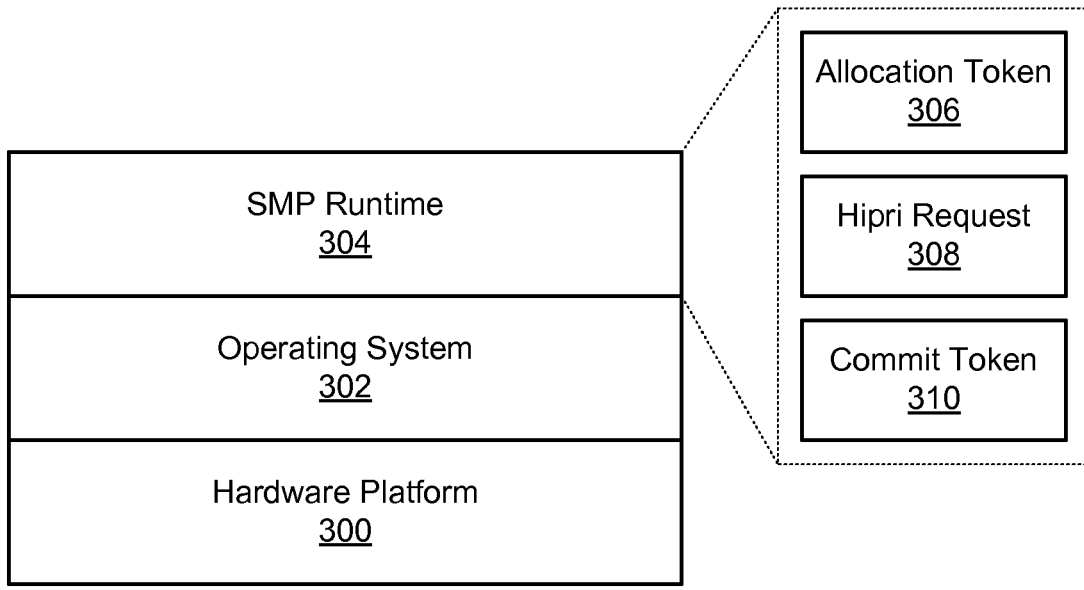
FIG. 3 is a high-level block diagram showing one embodiment of an SMP runtime in accordance with the invention, running on top of an operating system and hardware platform.

Referring to FIG. 3, in certain embodiments, an SMP computing system 100 in accordance with the invention includes a hardware platform 300 (i.e., processors 102a-c, bus 106, caches 200a-c, 202, memory 104c, etc.). An operating system 302 supporting symmetric multiprocessing (SMP) may run on top of the hardware platform 300 and an SMP runtime 304 may run on top of the operating system 302. As illustrated in FIG. 3, the SMP runtime 304 uses various global variables 306, 308, 310 to roll back and retry conflicted threads in a symmetric-multiprocessing (SMP) environment. These variables include one or more of an allocation token 306, a high-priority (i.e., "Hipri") request 308, and a commit token 310. The manner in which the SMP runtime 304 uses these variables 306, 308, 310 will be discussed in more detail hereafter. As will be shown hereafter, these variables 306, 308, 310 may be used by the SMP runtime 304 in such a manner as to eliminate the need to lock the allocation token 306. That is, the SMP runtime 304 uses the variables 306, 308, 310 in such a way as to eliminate the need to implement a shared lock between the kernel (i.e., operating system 302) and the SMP runtime 304.

Figure 4:
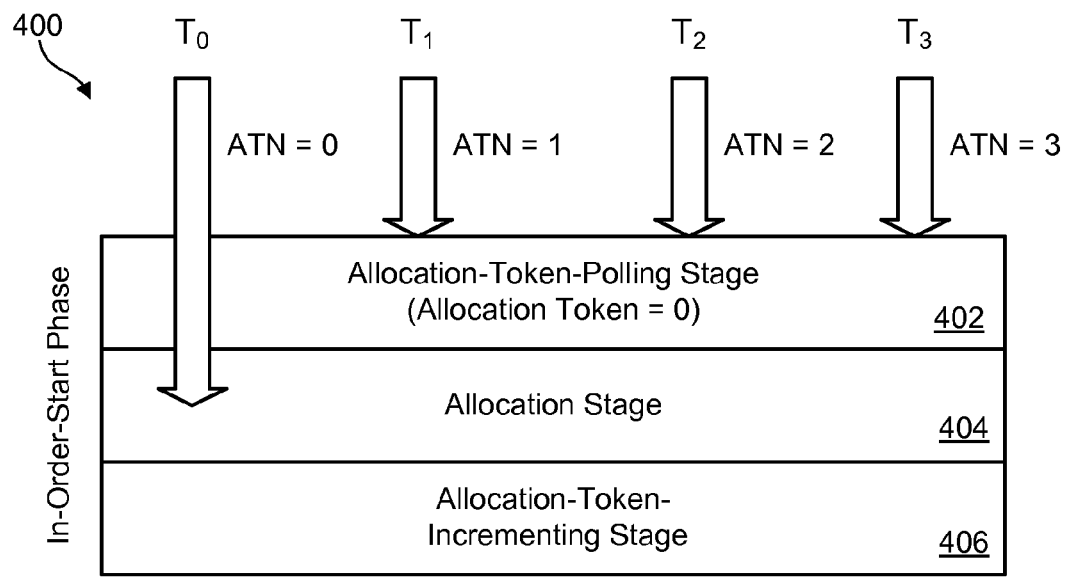
FIG. 4 is a high-level block diagram showing various threads progressing through an in-order-start phase of the SMP runtime illustrated in FIG. 3.

Referring to FIG. 4, as previously mentioned, speculative execution (SE), also known as thread-level speculation (TLS), requires in-order start, as well as in-order commit of threads. The workload is typically split into a sequence of work units, referred to as absolute thread numbers (ATNs), which are assigned to a team of n threads, in sequence. A complete round of allocation assigns work units to threads $T_0$, $T_1, \ldots, T_{n-2}, T_{n-1}$. By dispatching the threads in order, and committing them in order, program semantics may be preserved.

In order to ensure that parallelized code generates the same output that it would if it were executed serially, namely by a single thread, the following criteria must be met: In a scenario where two threads a and b are waiting for a speculation identifier (referred to herein as a "specID"), and the threads have been assigned work units with ATN values x and y respectively, if x<y, then thread a should receive a specID that is younger than thread b. Furthermore, where threads have consecutive ATNs, there should be no gap between the specIDs assigned to the threads.

FIG. 4 is a high-level block diagram showing multiple threads $T_0$, $T_1$, $T_2$, and $T_3$ progressing through an in-order-start phase 400 of the SMP runtime 304. Under a normal operating mode, a thread-selection phase assigns each thread a unique ATN value. FIG. 4 shows a scenario where the thread selection phase has assigned fours threads $T_0$, $T_1$, $T_2$, and $T_3$ work units having ATNs 0, 1, 2, and 3, respectively. A global counter, namely the allocation token 306 previously discussed, is used to start the threads in the order of their ATN values. In the illustrated example, the allocation token 306 is initialized to zero to allow the thread having ATN=0 to start.

Each thread, after receiving a work unit associated with a particular ATN, proceeds to the in-order-start phase illustrated in FIG. 4. As shown, the in-order-start phase 400 includes an allocation-token-polling stage 402, an allocation stage 404, and an allocation-token-incrementing stage 406. During the allocation-token-polling stage 402, each thread polls the allocation token 306 and waits for its turn to receive a specID. When the allocation token 306 equals a thread's ATN value, the thread proceeds to the allocation stage 404. During the allocation stage 404, the thread is allocated a hardware specID. After receiving a specID, the thread proceeds to the allocation-token-incrementing stage 406, which increments the allocation token 306 by one to allow the next thread to proceed through the in-order-start phase 400. Using this protocol, only a single thread passes through the allocation stage 404 at any given time.

Figure 5:
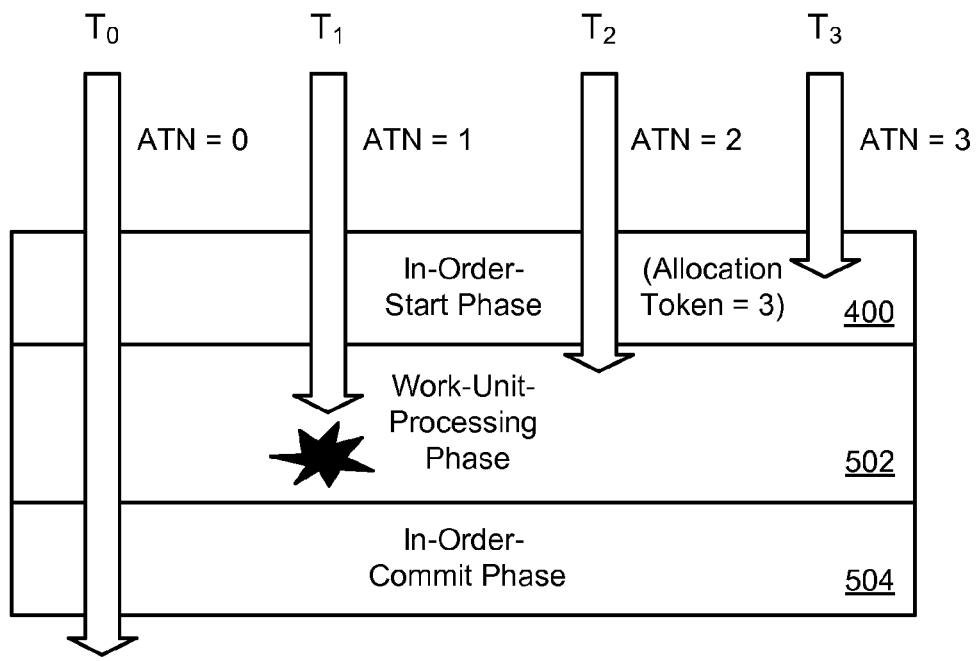
FIG. 5 is a high-level block diagram showing an example of a thread that aborts after progressing through the in-order-start phase of the SMP runtime illustrated in FIG. 3.

Referring to FIG. 5, complication of the above protocol arises in situations where a thread is rolled back and needs to retry its work unit, such as in cases where a thread aborts due to a conflict. In a rollback scenario, a thread which was previously allocated a specID aborts while performing its work unit and returns to the in-order-start phase 400 in order to receive a new specID. Note that such a thread still has the same ATN it had prior to aborting. However, by the time the thread aborts, the allocation token 306 will have incremented above the thread's ATN value. Furthermore, by the time the thread aborts, other threads with larger ATNs may have already proceeded through the in-order-start phase and received specIDs. FIG. 5 shows such a scenario.

As shown in FIG. 5, after proceeding through the in-order-start phase 400, a thread $T_0$ processes its work unit while in the work-unit-processing phase 502. Upon completing its work unit, $T_0$ proceeds to an in-order-commit phase, where it waits for a global counter (i.e., the commit token 310 previously discussed) to equal its ATN. When the commit token 310 equals its ATN, $T_0$ commits the work that was performed in the work-unit-processing phase 502.

Assume that a second thread $T_1$ has proceeded through the in-order-start phase 400 and is processing its work unit in the work-unit-processing phase 502 when it aborts due to a conflict or other problem. Further assume that at the time $T_1$ aborts, $T_2$ has already proceeded through the in-order-start phase 400 and received a specID. Assume that thread $T_2$ has incremented the allocation token 306 to three, thereby allowing thread $T_3$ to begin proceeding through the in-order-start phase 400. When thread $T_2$ aborts, thread $T_2$ returns to the in-order-start phase 400 in order to retry its work unit. The ATN value assigned to thread $T_2$ remains unchanged.

Because the allocation token 306 has incremented above the ATN of thread $T_2$ by the time $T_2$ returns to the in-order-start phase 400, thread $T_2$ will not get a chance to retry its work unit under a normal operating mode. That is, the allocation token 306 will never equal $T_2$'s ATN, thereby preventing $T_2$ from re-proceeding through the in-order-start phase 400. Simply resetting the allocation token 306 to the ATN of $T_2$, thereby allowing $T_2$ to once again proceed through the in-order-start phase 400, may create a race on the allocation token 306 (i.e., a race may be created between the aborted thread attempting to retry its work unit and the thread currently passing through the in-order-start phase 400, each of which may attempt to update the allocation token 306). Such a scenario may lead to program hangs.

In order to eliminate the race condition discussed above, the oldest aborted thread may set the high-priority request variable 308 previously discussed instead of modifying the allocation token 306 directly. The high-priority request 308 may identify the oldest aborted thread's ATN and indicate that the oldest aborted thread wishes to reenter the allocation stage 404 and receive a new specID, thereby allowing the oldest aborted thread to retry its work unit. A younger thread whose ATN is equal to the allocation token 306 will, upon entering the allocation-token-polling stage 402, detect that the high-priority request 308 is set. The younger thread may then set the allocation token 306 equal to the ATN identified in the high-priority request 308. This will allow the oldest aborted thread to re-proceed through the in-order-start phase 400 and receive a new specID. This methodology will be discussed in more detail in association with FIG. 6.

Figure 6:
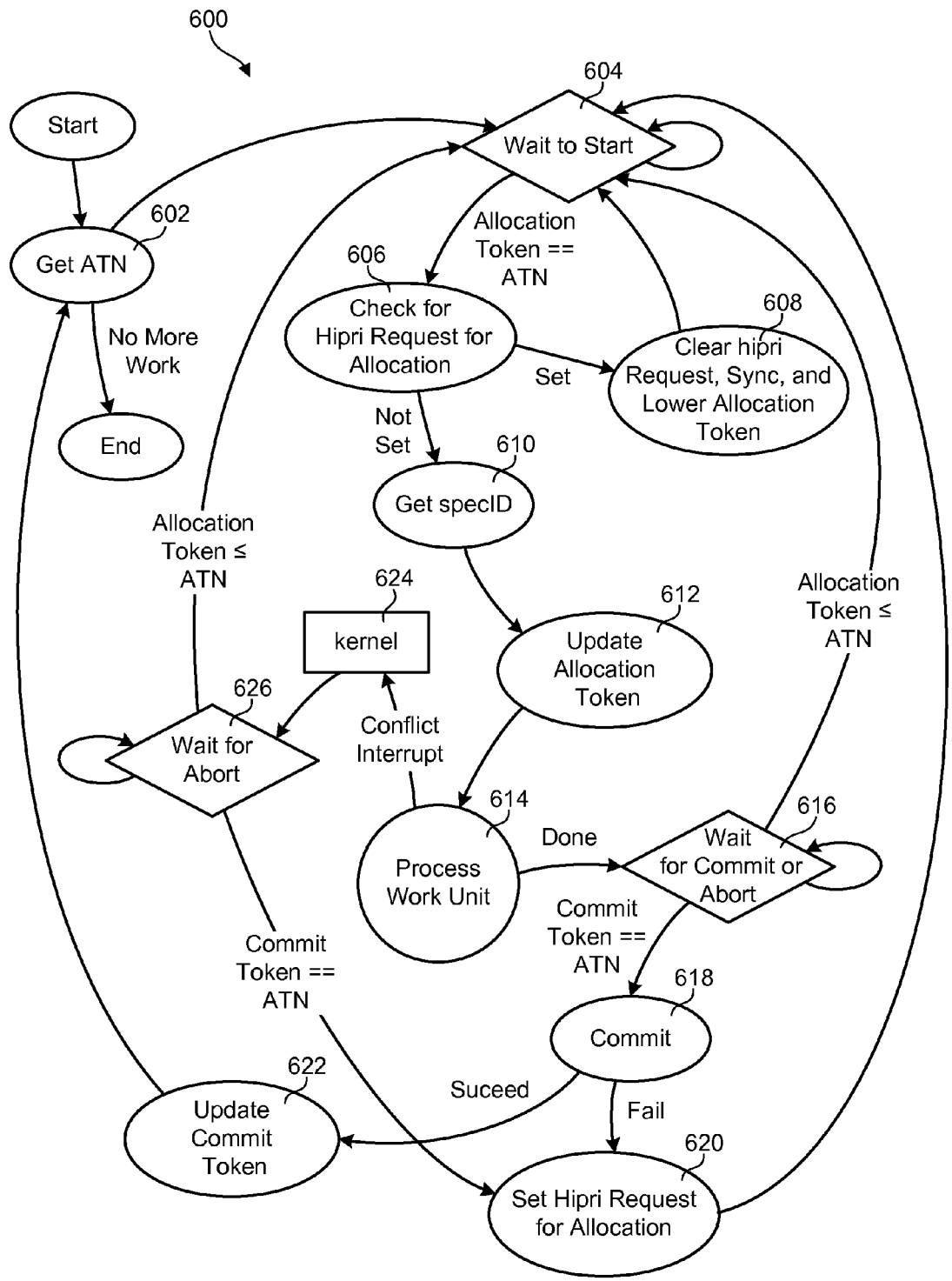
FIG. 6 is a state diagram showing operation of the SMP runtime illustrated in FIG. 3.

Referring to FIG. 6, a state diagram 600 showing the operation of the SMP runtime when rolling back and retrying conflicted (i.e., aborted) threads is illustrated. For the sake of example, the state diagram 600 will be discussed in association with a set of threads $T_0$, $T_1$, $T_2$, and $T_3$. Assume that the thread $T_0$ is initially assigned 602 a work unit having ATN=0, after which the thread waits at step 604 by polling the allocation token 306. When the thread $T_0$ detects that the allocation token 306 equals the thread's ATN, the thread $T_0$ checks the high-priority request 308 for allocation. Assuming the high-priority request 308 is not set, the thread $T_0$ receives 610 a specID and updates 612 the allocation token 306 (i.e., increments the allocation token 306 to allow the next thread $T_1$ (ATN=1) to enter the in-order-start phase 400 and receive a specID).

Once the thread $T_0$ updates 612 the allocation token 306, the thread $T_0$ begins processing 614 its work unit. Assuming the thread $T_0$ finishes its work unit, the thread $T_0$ waits 616 to commit 618 (i.e., make permanent) the work unit. Waiting 616 may include waiting 616 for a commit token 310 to equal the thread's ATN, thereby authorizing the thread $T_0$ to commit 618 its work unit. Alternatively, the thread $T_0$ may experience a conflict while processing 614 its work unit that may cause a hardware interrupt to be generated and sent to the kernel 624. In such a case, the thread $T_0$ may proceed to step 626 and wait to abort. Waiting 626 to abort may include waiting 626 for a commit token 310 to equal the thread's ATN so that the thread $T_0$ may abort and return to step 604, where it may wait to retry its work unit. If the commit token 310 increments to equal the thread's ATN, thereby allowing it to abort, the thread $T_0$ will know that it is the oldest aborted thread. That is, the thread $T_0$ will know that threads having ATNs lower than thread $T_0$'s ATN will have successfully committed since the commit token 310 was incremented to equal thread $T_0$'s ATN. For the purposes of this specification, the "oldest aborted thread" is defined to be the aborted thread whose ATN is equal to the commit token 310. This is important since only the oldest aborted thread is allowed to set the high-priority request 308. Where thread $T_0$ is the oldest aborted thread, thread $T_0$ will set 620 the high-priority request 308 for allocation to equal its ATN and return to step 604, where it may wait to retry its work unit.

On the other hand, if thread $T_0$ completes its work unit without experiencing a conflict, the thread $T_0$ may proceed to step 616 where it may wait for the commit token 310 to equal its ATN and thereby receive authorization to commit 618 its work unit. If the commit token 310 equals thread $T_0$'s ATN and the thread $T_0$ is able to successfully commit its work unit, the thread $T_0$ may update (i.e., increment) the commit token 310 and return to step 602, where it may receive a new ATN and associated work unit. The thread $T_0$ may then proceed through the state diagram 600 with a new work unit in the manner previously described.

On the other hand, if the commit token 310 equals thread $T_0$'s ATN but the thread $T_0$ is not able to successfully commit its work unit, the thread $T_0$ may set the high-priority request 308 for allocation to equal its ATN. As previously mentioned, setting the high-priority request 308 may indicate that the thread $T_0$ wishes to retry its work unit and thus would like the allocation token 306 to be decremented to equal its ATN. The thread $T_0$ may then return to step 604 to wait to retry its work unit.

When an oldest aborted thread aborts and sets the high-priority request 308, all threads younger than the oldest aborted thread will also abort (if they haven't already) and return to step 604, since these threads will need to restart and commit sequentially. For example, assume that thread $T_0$ aborts at step 616 or step 626 and sets 620 the high-priority request 308. Further assume that at the time thread $T_0$ aborts and sets the high-priority request 308, younger threads $T_1$ (ATN=1) and $T_2$ (ATN=2) have already passed through the in-order-start phase 400 and have received specIDs, thereby allowing them to process their work units. Further assume that thread $T_3$ (ATN=3) is waiting at step 604 to enter the in-order-start phase 400. When the allocation token 306 is incremented to 3, thread $T_3$ will enter the in-order-start phase 400 and check 606 the high-priority request 308 for allocation. In this example, thread $T_3$ will see that the high-priority request 308 is set to the ATN of thread $T_0$. Upon making this observation, thread $T_3$ will lower 608 the allocation token to 0 (i.e., the ATN of $T_0$), clear 608 the high-priority request 308, and return to step 604. When the allocation token 306 is lowered to 0, thread $T_0$ (which is waiting at step 604) will detect that its ATN is equal to the allocation token 306 and reenter the in-order-start phase 400, thereby receiving a new specID.

When the allocation token 306 is lowered to 0, threads $T_1$ and $T_2$, which have already previously passed through the in-order-start phase 400 and received specIDs, will either be processing 614 their work units, waiting at step 616 to commit their work units, or waiting at step 626 to abort their work units. Upon aborting and setting the high-priority request 308, thread $T_0$ may invalidate the specIDs of these threads. This will cause hardware interrupts to be generated for threads $T_1$ and $T_2$, thereby rolling back threads $T_1$ and $T_2$ to the beginning of the in-order-start phase 400 (i.e., step 604). These threads will then retry in order as the allocation token 306 is incremented above 0. Alternatively, threads $T_1$ and $T_2$ may be configured to detect when the allocation token 306 is lower than their ATNs and, in response, return to step 604 to retry their work units.

The illustrated method 600 has the benefit that since only one thread can be passing through the in-order-start phase 400 at any one time, there is no need to lock the allocation token 306. Only the thread that is passing through the in-order-start phase 400 can modify the allocation token 306. The thread that is passing through the in-order-start phase 400 will either increment the allocation token 306 or, if the high-priority request 308 is set, set the allocation token 306 to the ATN value identified in the high-priority request 308. This eliminates the need for a shared lock and prevents races on the allocation token 306. In the event a thread is the oldest aborted thread and all other threads have already proceeded through the in-order-start phase 400, the oldest aborted thread may in this instance be allowed to modify the allocation token 306 to equal its ATN, and thereby retry its work unit.

The disclosed technique leads to significant performance improvement and is much easier to debug. This is because the kernel may be kept minimalistic by leaving the invalidation of younger threads to the SMP runtime 304.

In certain embodiments, to minimize the number of specIDs that are allocated, the SMP runtime 304 may be configured to run the oldest thread non-speculatively. The oldest thread may have the privilege of modifying the main memory 104c directly, instead of buffering in the L2 cache 202. At any given time, only a single thread may be allowed to run non-speculatively. A thread, which is already running speculatively, or is about to run speculatively because it has already obtained a specID, may not switch to run non-speculatively even if it becomes the oldest thread. This is because the decision to run non-speculatively may be made inside the allocation stage 404 and may not be changed at a later time.

Figure 7:
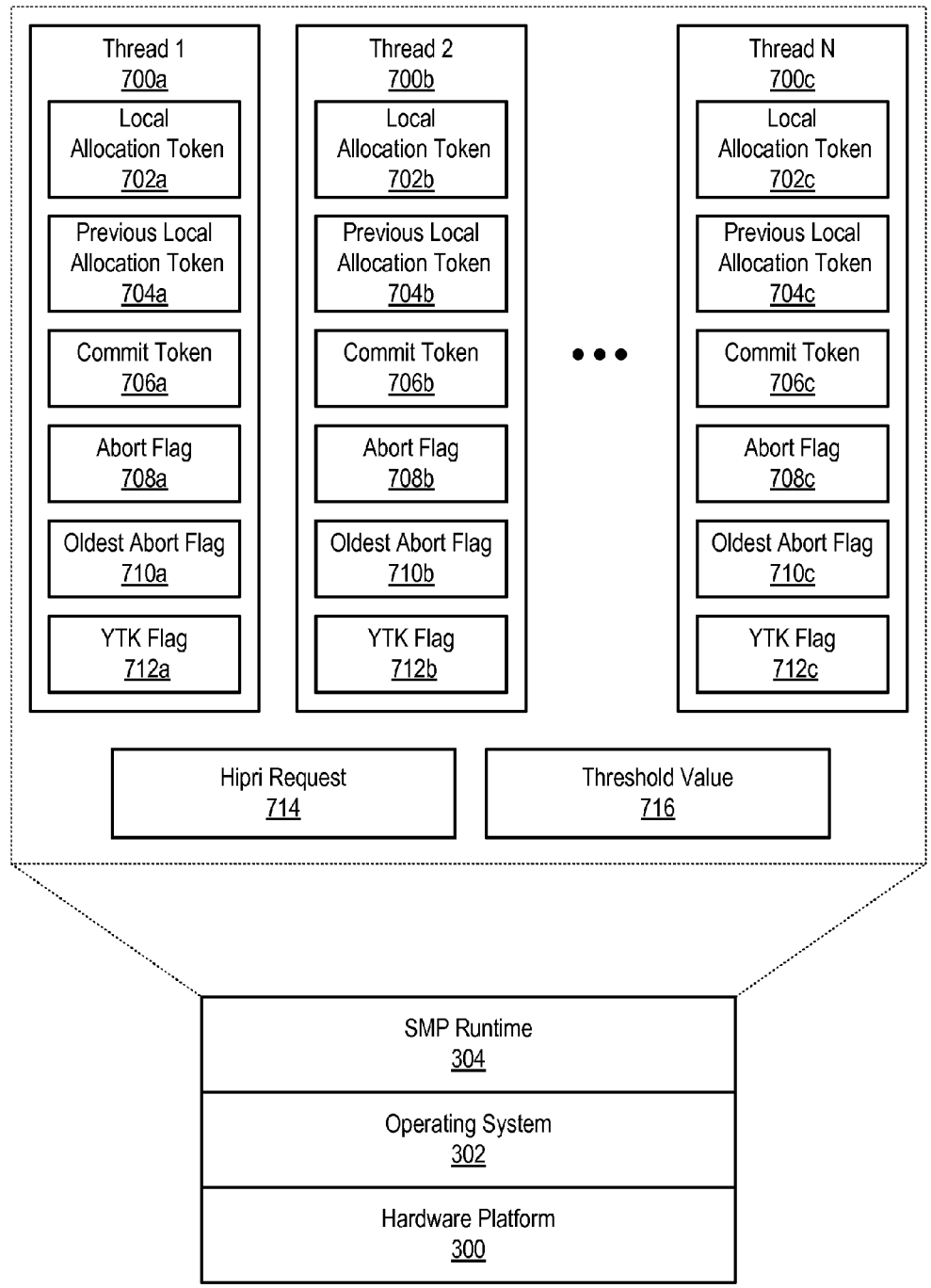
FIG. 7 is a high-level block diagram showing another embodiment of an SMP runtime in accordance with the invention.
Figure 8:
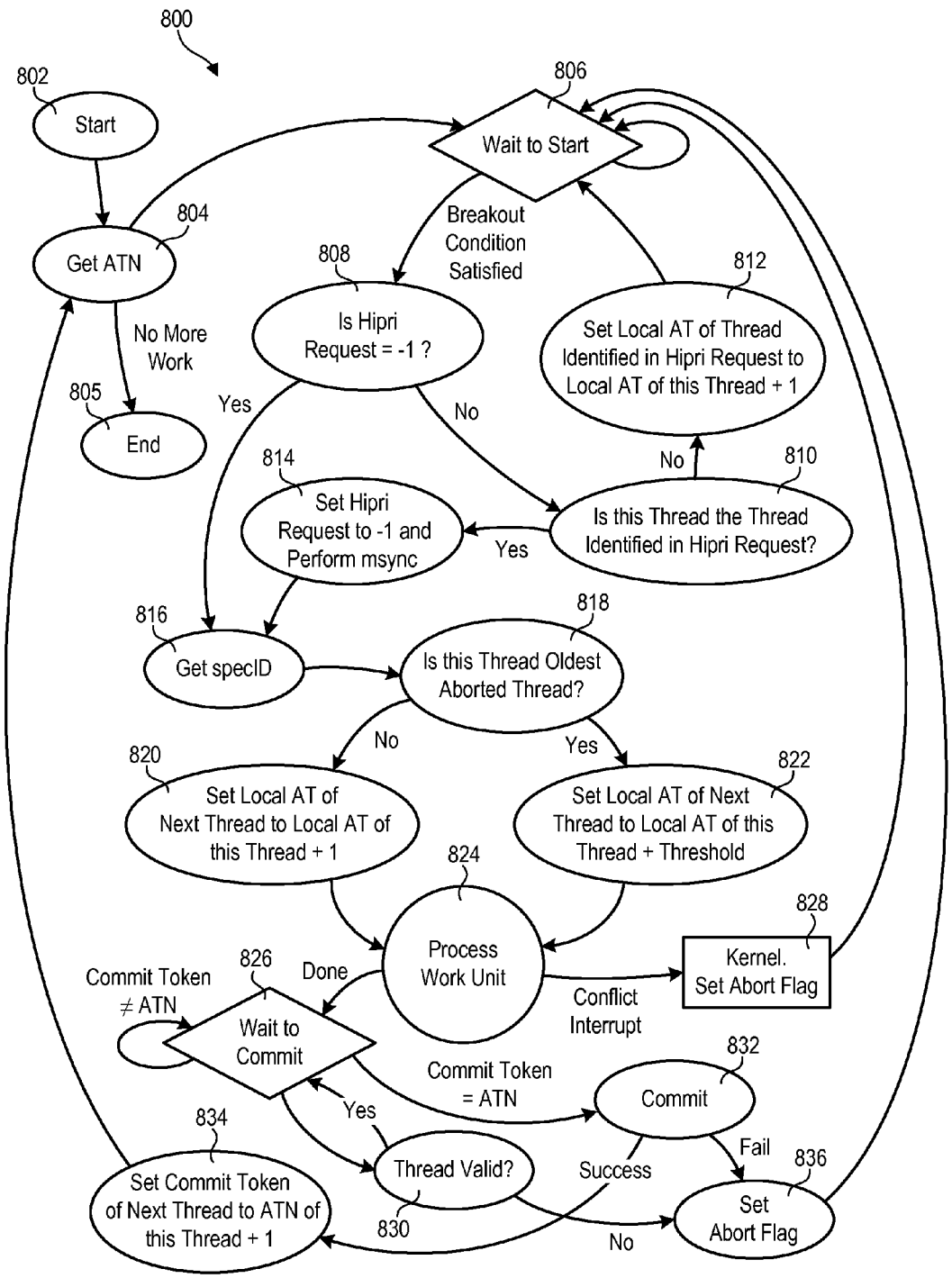
FIG. 8 is a state diagram showing operation of the SMP runtime illustrated in FIG. 7.
Figure 9:
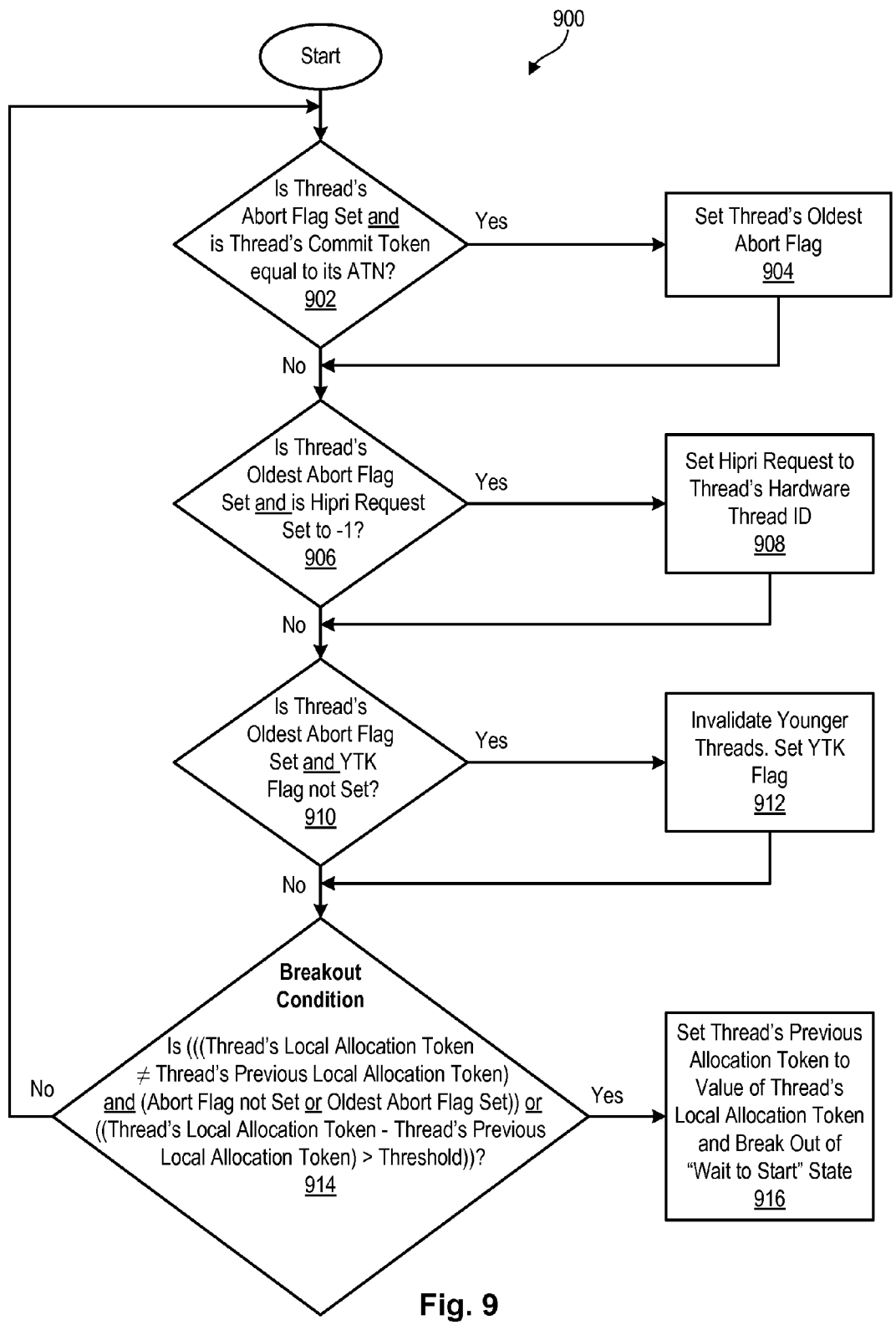
FIG. 9 is a process flow diagram showing various conditions implemented at the "wait start" state of FIG. 8, including a breakout condition.

Referring generally to FIGS. 7 through 9, in certain embodiments, the SMP runtime 304 discussed in association with FIGS. 3 through 6 may be modified to minimize memory traffic. The SMP runtime 304 discussed in associated with FIGS. 3 through 6 uses global tokens 306, 310 to implement a static scheduling scheme. The scheduling scheme is static in that the order of execution of threads is known—i.e., each thread has a fixed predecessor and successor thread. That is, if a thread executes a work unit having an ATN, the next thread will execute a work unit having the ATN+1. Using global tokens to coordinate the execution of such threads, although functional, may not be optimal or necessary in all computing architectures.

For example, in an SMP computing system 100 such as that illustrated in FIG. 2, each processor core 102a-c shares the same L2 cache 202. Each processor core 102 supports a given number N (e.g., 4) of hardware threads, with each hardware thread of a particular core 102 sharing the core's L1 cache 200. Once a thread on a core 102 posts a global token 306, 310, the threads on the other cores 102 who are polling the token 306, 310 will have their local (L1-cached) copy of the token 306, 310 invalidated. The threads would then all suffer an L1 miss at about the same time, thereby causing a surge of traffic to the L2 cache 202 to fetch the updated token 306, 310.

In certain embodiments, the SMP runtime 304 may be designed to avoid or minimize such traffic surges, particularly in situations where the order in which threads will execute is clear. In the present application, the order of allocation is known and only a single hardware thread (i.e., the next hardware thread) and core 102 needs to know when a token is updated so that it can be allocated a specID. FIGS. 7 through 9 disclose an alternative embodiment of an SMP runtime 304 that avoids or minimizes the traffic surges discussed above. This embodiment utilizes distributed tokens to ensure in-order start, as well as in-order commit of threads, while still eliminating or minimizing locking requirements used in conventional implementations. This embodiment, instead of using a single global allocation token 306 and single global commit token 310 for all hardware threads, uses a local allocation token 702 and a local commit token 706 for each thread 700. That is, each thread 700 has its own allocation token 702 and commit token 706. The manner in which the tokens are used will be described in more detail hereafter.

The distributed-token scheme disclosed in association with FIGS. 7 through 9 significantly improves performance. For example, consider a worse case scenario on a sixteen-core Blue Gene/Q processor, where each core has four hardware threads, using the scheme disclosed in FIGS. 3 through 6. Assuming a thread on core 0 posts a token, and a thread on core 15 is the successor, an invalidated L1 copy of the global token for the thread on core 15 would take (4 cycles×14) to become updated. This assumes that cores 1 through 14 request the updated global token prior to core 15.

On average for the Blue Gene/Q processor, if a request from a successor thread is 7 cores away from its predecessor thread, the average latency for updating the global token is 7×4 cycles. By contrast, using the distributed-token scheme described in FIGS. 7 through 9, the latency to observe an updated token is reduced from an average of 28 cycles to 4 cycles. Such latency reduction may be observed for both the allocation token and the commit token. The distributed-tokens approach disclosed in FIGS. 7 through 9 is a natural extension of the global-tokens approach disclosed in FIGS. 3 through 6.

FIG. 7 shows one embodiment of an SMP runtime 304 that uses a distributed-tokens approach for ensuring in-order start, as well as in-order commit of threads 700a-c. As shown, using a distributed-tokens approach, each thread 700 is assigned its own local allocation token 702 and commit token 706. In addition, each thread 700 is assigned a previous local allocation token 704, an "abort" flag 708, an "oldest abort" flag 710, and a "younger threads killed" (YTK) flag 712. These tokens 702, 704, 706 and flags 708, 710, 712 are presented by way of example and not limitation. The manner in which these tokens and flags are used will be described in more detail hereafter. In this particular embodiment, the SMP runtime 304 also uses a global high-priority ("hipri") request 714 and global threshold value 716. The threshold value 716 may be set to any value greater than the number of threads in the SMP computing system 100.

Referring to FIG. 8, a state diagram 800 showing operation of an SMP runtime 304 using a distributed-tokens approach is illustrated. The state diagram 800 is based on the same static scheduling scheme as the state diagram 600 of FIG. 6. In the state diagram 600 of FIG. 6, the global allocation token 306 may take on values ranging from 0 to the number of ATNs minus one. By contrast, in the state diagram 800 of FIG. 8, a thread's local allocation token 702 is always increasing, even under rollback circumstances. Furthermore, unlike the state diagram 600 of FIG. 6, a thread's local allocation token 702 is not compared to its ATN. Instead, the thread's local allocation token 702 is compared to its previous local allocation token 704, as will be explained in more detail hereafter. In short, a thread will receive a specID when the difference between the thread's local allocation token 702 and its previous local allocation token 704 is non-zero.

As shown in FIG. 8, a "wait to start" state 806 is used to synchronize both fresh start threads (i.e., threads that have not been aborted) and rollback threads (i.e., threads that have been aborted). Because the "wait to start" state 806 manages both fresh start threads and rollback threads, conditions for breaking out of the "wait to start" state 806 are substantially more complex than the conditions needed to break out of the "wait to start" state 604 described in FIG. 6. Conditions for breaking out of the "wait to start" state 806 are described below in association with FIG. 9.

Referring to FIG. 9, while continuing to refer generally to FIG. 8, a process flow diagram showing a method 900 executed by a thread at the "wait to start" state 806 is illustrated. As shown, at the "wait to start" state 806, a thread initially checks 902 whether its "abort" flag 708 is set (indicating that the thread is a rollback thread as opposed to a fresh start thread) and whether its commit token 706 is equal to its ATN (indicating, if it is a rollback thread, that it is the oldest aborted thread). If both conditions are true, the thread sets 904 its "oldest abort" flag 710 (indicating that the thread is the oldest aborted thread) and proceeds to step 906. If the thread determines that one or more of the conditions at step 902 are not true, the thread proceeds directly to step 906.

At step 906, the thread checks whether its "oldest abort" flag 710 is set and whether the high-priority request 714 is set to −1 (in this disclosure, a value of −1 indicates that the high-priority request 714 is not set—i.e., no thread is requesting allocation). If both conditions are true, the thread sets the high-priority request 714 to its hardware thread ID and proceeds to step 910. If one or more of the conditions at step 906 are not true, the thread proceeds directly to step 910.

At step 910, the thread checks whether its "oldest abort" flag 710 is set (indicating that it is the oldest aborted thread) and whether its "younger threads killed" (YTK) flag is not set (indicating that threads younger than the oldest aborted thread have not yet been "killed", or invalidated). If both conditions are true, the thread (i.e., the oldest aborted thread) invalidates 912 the spec IDs (i.e., "kills") all threads younger than itself. The thread then sets 912 its YTK flag 712 to indicate that all younger threads have been killed. The thread then proceeds to step 914. If either of the conditions at step 910 are evaluated not to be true, the thread proceeds directly to step 914.

Step 914 is referred to herein as the "breakout condition." That is, if a thread satisfies the conditions specified in step 914, the thread is allowed to break out of the "wait to start" state 806 and proceed to other steps of the state diagram 800. As mentioned above, the breakout condition 914 is somewhat complex because the breakout condition 914 is designed to synchronize both fresh start threads and rollback threads. As shown in the breakout condition 914 of FIG. 9, if a thread's local allocation token 702 is not equal to its previous local allocation token 704 and the thread's "abort" flag 708 is not set or the thread's "oldest abort" flag 710 is set, or the thread's local allocation token 702 minus its previous local allocation token 704 is greater than the threshold value 716 previously discussed, then the thread sets 916 its previous local allocation token 704 to the current value of its local allocation token 702 and breaks out 916 of the "wait to start" state 806. Otherwise, the thread remains in the "wait to start" state 806 and proceeds back to the top of the method 900 to repeat the method steps.

Referring again to FIG. 8, a scenario involving a fresh start thread (not a rollback thread) will now be discussed as it relates to the state diagram 800. In general, a fresh start thread will begin at start state 802 (if it has not yet processed a work unit) or at step 834 (if it has already successfully processed a work unit). The fresh start thread will then receive a work unit and associated ATN at step 804 and proceed to the "wait to start" state 806. If there is no work available, the fresh start thread moves to the end state 805. At the "wait to start" state 806, the fresh start thread loops until its local allocation token 702 differs with respect to its previous local allocation token 704 (thereby satisfying the breakout condition 914). When the breakout condition 914 is satisfied, the thread sets its previous local allocation token 704 to the current value of its local allocation token 702 (effectively capturing the current value of the thread's local allocation token 702) and breaks out of the "wait to start" state 806. The fresh start thread then proceeds to step 808, where the thread determines whether the high-priority request 714 is set to −1. For the purposes of this disclosure, a high-priority request 714 that is set to −1 indicates that no thread has rolled back (i.e., aborted) and is requesting a specID. By contrast, a high-priority request 714 that is set to a value other than −1 indicates that a thread has rolled back and is requesting a specID.

Assume that the high-priority request 714 is set to −1 (i.e., no rollback thread). In such a case, the fresh start thread proceeds to step 816 to receive a specID. The fresh start thread then proceeds to step 818. Since the thread in this example is not an oldest aborted thread, the fresh start thread proceeds to set 820 the local allocation token 702 of the next thread to the local allocation token 702 of the fresh start thread plus one. This will create a non-zero difference between the next thread's local allocation token 702 and its previous local allocation token 704, thereby allowing it to break out of the "wait to start" state 806 and receive a specID. In this way, each thread that receives a specID may cause the next thread to break out of the "wait to start" state 806 and receive a specID, thereby ensuring that threads start in order.

At step 824, the fresh start thread begins processing 824 its work unit. When the work unit is complete, the fresh start thread proceeds to the "wait to commit" state 826, where it may wait to commit the work performed at step 824. In general, a thread will wait at the "wait to commit" state 826 until its commit token 706 is set to a value that equals its ATN. When its commit token 706 equals its ATN, the thread will exit the "wait to commit" state 826 and commit 832 its work unit. Assuming the commit succeeds, the fresh start thread will set 834 the commit token 706 of the next thread to the fresh start thread's ATN value plus one. This will allow the thread with the next ATN value to commit its work unit. In this way, threads will be committed in order. After setting the commit token 706 of the next thread at step 834, a thread will proceed back to step 804, where it will receive a new work unit and associated ATN. If no work unit is available, the thread will proceed to the end state 805.

If, while processing its work unit at step 824, a thread experiences a conflict that causes a hardware interrupt to be generated and sent to the kernel 828, the thread will terminate processing (i.e., abort) and set 828 its "abort" flag 708. The thread will then return to the "wait to start" state 806 where it will wait to break out and receive a new specID, thereby allowing it to retry its work unit. Similarly, if a thread at step 832 fails to commit its work unit, the thread will abort, set 836 its "abort" flag 708, and return to the "wait to start" state 806.

Similarly, while a thread waits to commit at step 826, the thread may be invalidated by another thread. For example, an oldest aborted thread may invalidate all threads younger than the oldest aborted thread to ensure that threads are restarted and committed in order. If, while waiting at the "wait to commit" state 826, a thread determines that its specID has been invalidated (see step 830), the thread will abort, set 836 its "abort" flag 708, and return to the "wait to start" state 806 where it may wait to retry its work unit.

To understand what occurs when one or more threads abort and return to the "wait to start" state 806, consider a scenario involving five threads: $T_0$, $T_1$, $T_2$, $T_3$, and $T_4$. For the sake of example, assume that thread $T_0$ successfully completes its work unit, whereas threads $T_1$, $T_2$, and $T_3$ receive spec IDs but abort prior to committing their work units. Further assume that thread $T_4$ has not yet received a specID. In this example, thread $T_1$ would be the oldest aborted thread.

Under this scenario, assume that thread $T_1$ aborts and returns to the "wait to start" state 806. After passing through steps 902, 906, 910 illustrated in FIG. 9, thread $T_1$ will determine that it is the oldest aborted thread when thread $T_0$ sets $T_1$'s commit token equal to its ATN. Thread $T_1$ will then set 904 its "oldest abort" flag 710, thereby asserting itself as the oldest aborted thread. Thread $T_1$ will also set 908 the high-priority request 714 to its hardware thread ID and invalidate younger threads $T_2$ and $T_3$, thereby causing these threads to abort and return to the "wait to start" state 806 (assuming they have not already aborted and returned to the "wait to start" state 806 on their own). Upon invalidating younger threads $T_2$ and $T_3$, thread $T_1$ sets its YTK flag 712 to indicate that the younger threads have been invalidated.

At this point, threads $T_1$, $T_2$, and $T_3$ will all be waiting at the "wait to start" state 806 to retry their work units. Assume that thread $T_4$'s local allocation token 702 is set to a value different from its previous local allocation token 704, thereby allowing $T_4$ to break out of the "wait to start" state 806. Upon breaking out of the "wait to start" state 806, $T_4$ will observe at step 808 that the high-priority request 714 is set to a value other than −1. Thread $T_4$ may then determine 810 whether it is the hardware thread identified in the high-priority request 714. If it is not the thread identified in the high-priority request 714 (which is the case in this example), thread $T_4$ sets the local allocation token 702 of the thread (in this example $T_1$) identified in the high-priority request 714 to the value of its (i.e., $T_4$'s) local allocation token 702 plus one. This will allow thread $T_1$ to break out of the "wait to start" state 806 and receive 816 a specID. Thread $T_4$ will then return to the "wait to start" state 806 and wait for its turn to receive a specID and process its work unit.

When thread $T_1$ observes at the "wait to start" state 806 that its local allocation token 702 is different from its previous local allocation token 704, and its "oldest abort" flag 710 is set, $T_1$ will break out. $T_1$ will then observe 808 that the high-priority request 714 is set to its hardware thread ID. $T_1$ will clear the high-priority request 714 (by setting the high-priority request 714 to −1). Thread $T_1$ will then proceed to receive a specID. Since $T_1$ is the oldest aborted thread, it begins a new generation of allocation tokens by setting 822 the local allocation token 702 of thread $T_2$ to its (i.e., $T_1$'s) local allocation token 702 plus the threshold value 716 previously discussed.

When thread $T_2$ sees that its local allocation token 702 minus its previous local allocation token 704 is greater than the threshold value 716, it will break out from the "wait to start" state 806 and receive 816 a specID. Thread $T_2$ will then set the local allocation token 702 of thread $T_3$ to the local allocation token 702 of thread $T_2$ plus one. Thread $T_3$ will then see that its local allocation token 702 minus its previous local allocation token 704 is greater than the threshold value 716. In response, thread $T_3$ will break out of the "wait to start" state 806 and receive a spec ID. Thread $T_3$ will then set the local allocation token 702 of thread $T_4$ to the local allocation token 702 of thread $T_3$ plus one. Thread $T_4$ will then break out from the "wait to start" state 806 since its "abort" flag 708 is not set and its local allocation token 702 is not equal to its previous local allocation token 704. Thread $T_4$ may alternatively break out because its local allocation token 702 minus its previous local allocation token 704 is greater than the threshold value 716. In any event, thread $T_4$ receives a specID and passes the allocation token back to thread $T_0$, assuming that there is more work to do.

As can be observed from the discussion above, the breakout condition 914 successfully synchronizes fresh start threads as well as aborted threads (i.e., threads with their "abort" flags 708 set). The breakout condition 914 is further configured to identify the oldest aborted thread so that younger threads can be invalidated.

Other features of the state diagram 800 illustrated in FIG. 8 are worth noting. For example, an "msync" (memory synchronize) is performed at step 814 following the clearing of the high-priority request 714 (i.e., setting the high-priority request 714 to −1). This msync is performed so that all threads in the system observe the clearing of the high-priority request 714 before the allocation gets passed to the next thread (by setting the next thread's local allocation token 702). This is because if the next thread falsely observes that the high-priority request 714 is set, the next thread may immediately pass the allocation back to the current thread, thereby causing deadlock. In some computing architectures (e.g., Power PC Architectures) an "isync" (instruction synchronize) may need to be performed at the start of step 808 to ensure that the high-priority request 714 is loaded from memory after exiting the process 900. The is because the Power PC Architecture has the ability to out-of-order execute a load from memory. The isync instruction acts as a fence to prevent this from occurring.

Another feature worth noting is that, in the state diagram 800, the oldest aborted thread is configured to clear the high-priority request 714 at step 814. This is because all other threads may have already passed the allocation point and, as a result, the oldest aborted thread needs to set as well as clear the high-priority request 714. If there is another younger thread in the system that acknowledges that the high-priority request 714 is set by passing the allocation token back to the oldest aborted thread, the oldest aborted thread should also clear the high-priority request 714.

Like the state diagram 600 illustrated in FIG. 6, the illustrated state diagram 800 reduces or eliminates the need for atomic operations. All updates to variables are performed by a single thread. This eliminates the need for shared locks on particular variables as well as prevents races thereon.

The block diagrams in the Figures illustrate the architecture, functionality, and operation of possible implementations of systems, methods, and computer-usable storage media according to various embodiments of the present invention. In this regard, each block in the block diagrams may represent a module, segment, or portion of code, which comprises one or more executable instructions for implementing the specified logical function(s). It should also be noted that, in some alternative implementations, the functions discussed in association with a block may occur in a different order than discussed. For example, two functions occurring in succession may, in fact, be implemented in the reverse order, depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The invention claimed is:

1. A computer program product for efficiently rolling back and retrying conflicted speculative threads in symmetric-multiprocessing (SMP) environments, the computer program product comprising a non-transitory computer-readable storage medium having computer-usable program code embodied therein, the computer-usable program code comprising:
   computer-usable program code to detect an aborted thread at runtime;
   computer-usable program code to determine whether the aborted thread is an oldest aborted thread;
   computer-usable program code to, in the event the aborted thread is the oldest aborted thread, set a high-priority request for allocation to an absolute thread number assigned to the oldest aborted thread;
   computer-usable program code to detect that the high-priority request is set; and
   computer-usable program code to, in response to detecting that the high-priority request is set, modify a local allocation token of the oldest aborted thread, wherein the modification prompts the oldest aborted thread to retry a work unit associated with its absolute thread number.

2. The computer program product of claim 1, wherein detecting that the high-priority request is set comprises detecting by a thread other than the oldest aborted thread.

3. The computer program product of claim 1, wherein modifying the local allocation token comprises setting the local allocation token to a value different from a previous local allocation token of the oldest aborted thread, wherein the difference prompts the oldest aborted thread to retry the work unit associated with its absolute thread number.

4. The computer program product of claim 1, further comprising computer-usable program code to abort all threads younger than the oldest aborted thread that have not already been aborted.

5. The computer program product of claim 4, wherein aborting all threads younger than the oldest aborted thread comprises invalidating speculative identifiers of all threads younger than the oldest aborted thread.

6. The computer program product of claim 1, wherein allowing the oldest aborted thread to retry comprises assigning a new speculative identifier to the oldest aborted thread.

7. The computer program product of claim 1, wherein determining whether the aborted thread is an oldest aborted thread comprises determining whether a local commit token of the aborted thread is equal to the absolute thread number of the aborted thread.

8. An apparatus for efficiently rolling back and retrying conflicted speculative threads in symmetric-multiprocessing (SMP) environments, the apparatus comprising:
- at least one processor;
- at least one memory device coupled to the at least one processor and storing computer instructions to cause the at least one processor to:
  - detect an aborted thread at runtime;
  - determine whether the aborted thread is an oldest aborted thread;
  - in the event the aborted thread is the oldest aborted thread, set a high-priority request for allocation to an absolute thread number assigned to the oldest aborted thread;
  - detect that the high-priority request is set; and
  - in response to detecting that the high-priority request is set, modify a local allocation token of the oldest aborted thread, wherein the modification prompts the oldest aborted thread to retry a work unit associated with its absolute thread number.

9. The apparatus of claim 8, wherein detecting that the high-priority request is set comprises detecting by a thread other than the oldest aborted thread.

10. The apparatus of claim 8, wherein modifying the local allocation token comprises setting the local allocation token to a value different from a previous local allocation token of the oldest aborted thread, wherein the difference prompts the oldest aborted thread to retry the work unit associated with its absolute thread number.

11. The apparatus of claim 8, further comprising computer instructions to cause the at least one processor to abort all threads younger than the oldest aborted thread that have not already been aborted.

12. The apparatus of claim 11, wherein aborting all threads younger than the oldest aborted thread comprises invalidating speculative identifiers of all threads younger than the oldest aborted thread.

13. The apparatus of claim 8, wherein determining whether the aborted thread is an oldest aborted thread comprises determining whether a local commit token of the aborted thread is equal to the absolute thread number of the aborted thread.

* * * * *